us007445042B2

(12) United States Patent
Freer et al.

(10) Patent No.: US 7,445,042 B2
(45) Date of Patent: Nov. 4, 2008

(54) SIGNALLING METHOD AND APPARATUS

(75) Inventors: John Freer, Peterhead (GB); Mark McCorry, Aberdeen (GB); Alex Watt, Fraserburgh (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 428 days.

(21) Appl. No.: 10/532,252

(22) PCT Filed: Oct. 22, 2003

(86) PCT No.: PCT/GB03/04542

§ 371 (c)(1),
(2), (4) Date: Nov. 15, 2005

(87) PCT Pub. No.: WO2004/038950

PCT Pub. Date: May 6, 2004

(65) Prior Publication Data

US 2006/0102341 A1    May 18, 2006

(30) Foreign Application Priority Data

Oct. 23, 2002 (GB) .................................. 0224649.4

(51) Int. Cl.
*E21B 29/02* (2006.01)
*E21B 47/00* (2006.01)

(52) U.S. Cl. .................................. 166/250.01; 166/66
(58) Field of Classification Search ............ 166/250.01, 166/66
See application file for complete search history.

(56) References Cited

FOREIGN PATENT DOCUMENTS

WO      WO 99/36802    *    7/1999

* cited by examiner

*Primary Examiner*—William P Neuder
(74) *Attorney, Agent, or Firm*—Kevin B. McGoff; Bryan P. Galloway; Tim Curington

(57) ABSTRACT

At least one three phase driven pumps (56) in a hydrocarbon well (10) well bore (12) uses frequency shift keyed digital signals (78) to pass instructions from a surface station (46, 26, 34, 30) to a tool (14, 76, 56) and reports from a tool (14, 76, 56) to the surface station (46, 26, 34, 30) in common mode through the three phase cables (16) using a star point (58) of the three phase cables (16) after each pump as the signal transmission and reception point and as the point for coupling a DC Power supply (28), also provided in common mode on the three phase cables (16), to the down hole electronic equipment (72 76). The surface equipment (46) and the tool (14) use as a common ground. The digital messages comprises an address portion (80) identifying either the tool (14) for which an instruction (82) is destined or the tool (14) from which a report (also 82) originates. The digital message (18) also comprises a checksum (84) for error identification and correction.

60 Claims, 4 Drawing Sheets

SIGNALLING METHOD AND APPARATUS

The present invention relates to the use of electrical equipment in a hydrocarbon well. More particularly, the invention relates to signalling to and from electrical equipment, notably in a hydrocarbon production well. Most particularly, the present invention relates to employing three phase power cables to transfer signals.

In downhole applications in a well bore in a hydrocarbon well, it is common to use an Electrical Submersible Pump (hereinafter referred to as an ESP) to pump the fluid up the well bore. It is also usual to employ other electrically driven equipment, such as valves. The explanation of the present invention is directed towards the electrically driven equipment being ESPs, but it is to be understood that any other electrically driven equipment can also be the subject of the present invention. The explanation of the present invention is also directed towards the fluid being a hydrocarbon. It is to be understood that the invention is equally applicable for any fluid, and can be water, or any chemical resource or product. The explanation of the invention is also particularized on the pumping of the fluid in a vertical well. It is to be appreciated that the invention is equally applicable to any configuration of conduit, including horizontal pipes and ducts, closed or open to the atmosphere.

Returning to the example of a substantially vertical hydrocarbon well, it is desirable, for certainty of operation and optimum performance of the well, to monitor physical parameters such as pressures and temperatures in the well bore, and to display such parameters at the surface. This can be achieved by providing dedicated cables from the surface to the well bore, for the sole purpose of operating the monitoring system. Various method exist whereby such monitored information can be displayed without the need for additional cables, the physical parameter data being transferred to the surface using the existing cables, namely the three phase electrical supply cable which is otherwise used to supply power to drive the ESP.

International Patent Application Number WO 01/03323 A1 (Power Line Communication System) achieves signalling by altering the characteristics of the inductive load of the ESP motor. Electrical connections are made within the motor windings and a leakage current is induced, which can be modulated using an appropriate modulation method. The leakage current induced in the windings is then detected at the surface using a receiver that monitors the current drawn (using a method of inductive coupling), and filters out the desired modulated signal by filtering in the frequency domain. The present invention seeks to provide a communication method and apparatus which improves over that disclosed in international Patent Application Number WO 01/03323 A1 by eliminating the need to vary the ESP load balance. The present invention further seeks to provide a communication method and apparatus which improves over that disclosed in International Patent Application Number WO 01/03323 A1 by removing the need to make internal connections to the motor windings and thus avoiding alterations to the ESP (or other electrical equipment) motor.

U.S. Pat. No. 5,670,931 (Method and Apparatus for Transmitting Data over a Power Cable Utilizing a Magnetically Saturable Core Reactor) employs a method of communication which modifies the motor supply current waveform. The waveform deformations created can be detected at the surface by monitoring the current drawn. The technique which is used both for creating the deformation of the waveform in the well bore, below the surface, and for detecting the deformation of the waveform at surface, is one of inductive coupling. Inductive coupling negates the need for a direct electrical connection onto the power supply lines.

The technique used in U.S. Pat. No. 5,670,931 is similar to that shown in Iinternational Patent Number WO 01/03323 A1 in that a characteristic of the motor load current is modified. The communication method used in U.S. Pat. No. 5,670,931 requires a physical connection to two of the wires or cables which provide the three phase motor power supply to the ESP. Although this connection is not directly onto the electrical conductors, U.S. Pat. No. 5,670,931 describes using a casing that is clamped around a conductor in order to make the inductive coupling. The present invention seek to provide improvement over the disclosure of U.S. Pat. No. 5,670,931 by avoiding the need to deform existing current waveforms, by eliminating the need to connect to two out of three power cables, and by eliminating the need for coupling casings which further restrict the small amount of space available in a well bore.

U.S. Pat. No. 5,515,038 (Data Transmission System) describes a digital transmission system employing a simultaneous method of communication using direct digital signals in a DC current loop. The communication method disclosed in U.S. Pat. No. 5,515,038, in the event of a ground fault, being a DC current loop method, is, by its very nature, unable to work. The present invention seeks to provide improvement over the method and apparatus disclosed in U.S. Pat. No. 5,515,038 by providing an alternative method and apparatus which can continue to function despite the presence of a ground fault. Further, U.S. Pat. No. 5,515,038 discloses a communication system which is unidirectional, conveying parametric data only from the well bore to the surface. By contrast, the present invention seeks to provide a communications method and apparatus which is bidirectional, allowing communication from the well bore to the surface and from the surface into the well bore.

The DC current loop digital method of communication, described in U.S. Pat. No. 5,515,038, is limited in its capability to achieve speed of transmission. Large value inductors are used to filter out the A.C. content of the drive power signal, and these large inductors limit the speed of switching between logic states in the digital transmission. By contrast, the present invention seeks to provide a method and apparatus with capability of much higher signalling speeds compared to those possible in the method and apparatus described in U.S. Pat. No. 5,515,038.

U.S. Pat. No. 4,631,536 (Multiplex Submersible Pump Telemetry System) describes an A.C. (Alternating Current) based transmission system which uses a high frequency carrier which is superimposed on the power waveform applied to the ESP power line which goes into the well bore. Sequencing of data then allows multiple sensor readings to be sent to surface, encoded as digital information.

This system described in U.S. Pat. No. 4,631,536 requires connection to two of power cables carrying the three phases of the ESP supply into the well bore. The present invention seeks to provide improvement over the system shown in U.S. Pat. No. 4,631,536 by avoiding the need to connect to two out of three conductors.

The communication system described in U.S. Pat. No. 4,631,536 is one-way, from the well bore to the surface. The present invention seeks to provide improvement over U.S. Pat. No. 4,631,536 by the use of a method and apparatus which permits bi-directional communication, from the surface to the well bore and from the well bore to the surface.

U.S. Pat. No. 4,631,536 does not provide tool addressing, whereby data or commands can be addressed to or retrieved from a specifiable one of a plurality of different pumps or other devices which may be in use in a well bore. The method and apparatus disclosed in U.S. Pat. No. 4,631,536 cannot therefore be configured as a common data bus system whereby one system can address a plurality of devices. By contrast, the present invention seeks to provide improvement over U.S. Pat. No. 4,631,536 by providing for individual tool addressing, allowing data from selectable ones of a plurality of individually selectable tools to be individually identified. Furthermore, the present invention seeks to improve over U.S. Pat. No. 4,631,536 by providing a method and apparatus whereby commands from the surface can be addressed to individual tools in the well bore such that only the tool (or tools)addressed respond to a command.

According to a first aspect, the present invention consists in a method for providing communications in a conduit between a control station and a communication device in the vicinity of a tool, said tool being electrically powered through a cable, within the conduit, said method comprising the steps of: generating a signal representative of a data message to be send; adding said signal to the power waveform on the cables; separating said signal from the power waveform on the cables; decoding said separated signal; and reconstituting said data message.

According to a second aspect, the present invention consists in an apparatus for providing communications in a conduit between a control station and a communication device in the vicinity of a tool, said tool being electrically powered through a cable, within the conduit, said apparatus comprising: generating means operative to generate a signal representative of a data message to be send; signal addition means operative to add said signal to the power waveform on the cables; separating means operative to separate said signal from the power waveform on the cables; decoding means operative to decode said separated signal; and reconstitution means, operative to reconstitute said data message.

The invention further provides that the frequency shift keyed signal can be separated from the power waveform on the cables by one or more frequency filters which can be at least one of a low pass filter, a high pass filter, and a band pass filter.

The invention further provides that the data message can originate at the control station and can be received at the device, and that the data message can originate at the device and can be received at the control station.

The invention further provides that a first type of digital message can be used for sending instructions from the control station to the device, and that a second type of digital message can be used for sending reports from the device to the control station.

The invention further provides that a plurality of machines can be used in the conduit; that the control station can include, in the first type of digital message, a machine address portion indicative of the identity of the device to which an instruction is addressed; that the control station can send the first type of data message to all of the plurality of devices; that each of the plurality of devices can decode the address portion; and that a particular one of the plurality of devices can respond to the instruction only if the address portion of the first type of message is indicative of the first type of message being addressed to that particular one of the plurality of devices.

The invention further provides that a plurality of machines can be used in the well bore; that each one of the plurality of devices can include, in a second type of digital message, a report address portion indicative of the identity of the device from which a report originates; that the control station can decode the report address portion; and that the control station can attribute the report to that one of the plurality of devices indicated by the report address.

The invention further provides that a device can provide a second type of digital message without reception of a first type of digital message, and that the second type of digital message can be employed for at least one of diagnostic purposes and tuning during a power up sequence.

The invention further provides that a device, from among the plurality of devices, can provide a report only after that particular device has received an instruction to provide a report.

The invention further provides that each sent data message can comprise an error detection portion containing error detection information; and that the error detection portion in each received data message can be examined to determine the digital integrity of the data message.

The invention further provides that the error detection portion can contain error detection information capable of allowing for correction of one or more errors.

The invention further provides that the error detection information can include a check sum.

The invention further provides that a report can contain information about at least one of temperature pressure, flow and vibration in the vicinity of the device.

The invention further provides that the cable can comprises at least two phases and that the signal is added to at least one of the phases.

The invention further provides that the windings to electrical equipment within the conduit can be three phase, that the cables can be three phase, and that the cables are joined in a star point after passage through the equipment, signals from the control station to a device and signals from a device to the control station being provided from and sent to the star point.

The invention further provides that a power supply for monitoring equipment in the well bore is connected to at least one of the cables, and that the power supply is coupled to the device via the star point.

The invention further provides that the device can have further attachment to a common ground, shared with the surface equipment, and that the common ground can be the local conductive production tubing disposed within the well bore.

The invention further provides that the conduit can be the well bore of a hydrocarbon well and that the control station can be at the surface.

The invention is further explained, by way of an example, by the following description, to be read in conjunction with the appended drawings, in which.

And

Figure 6:
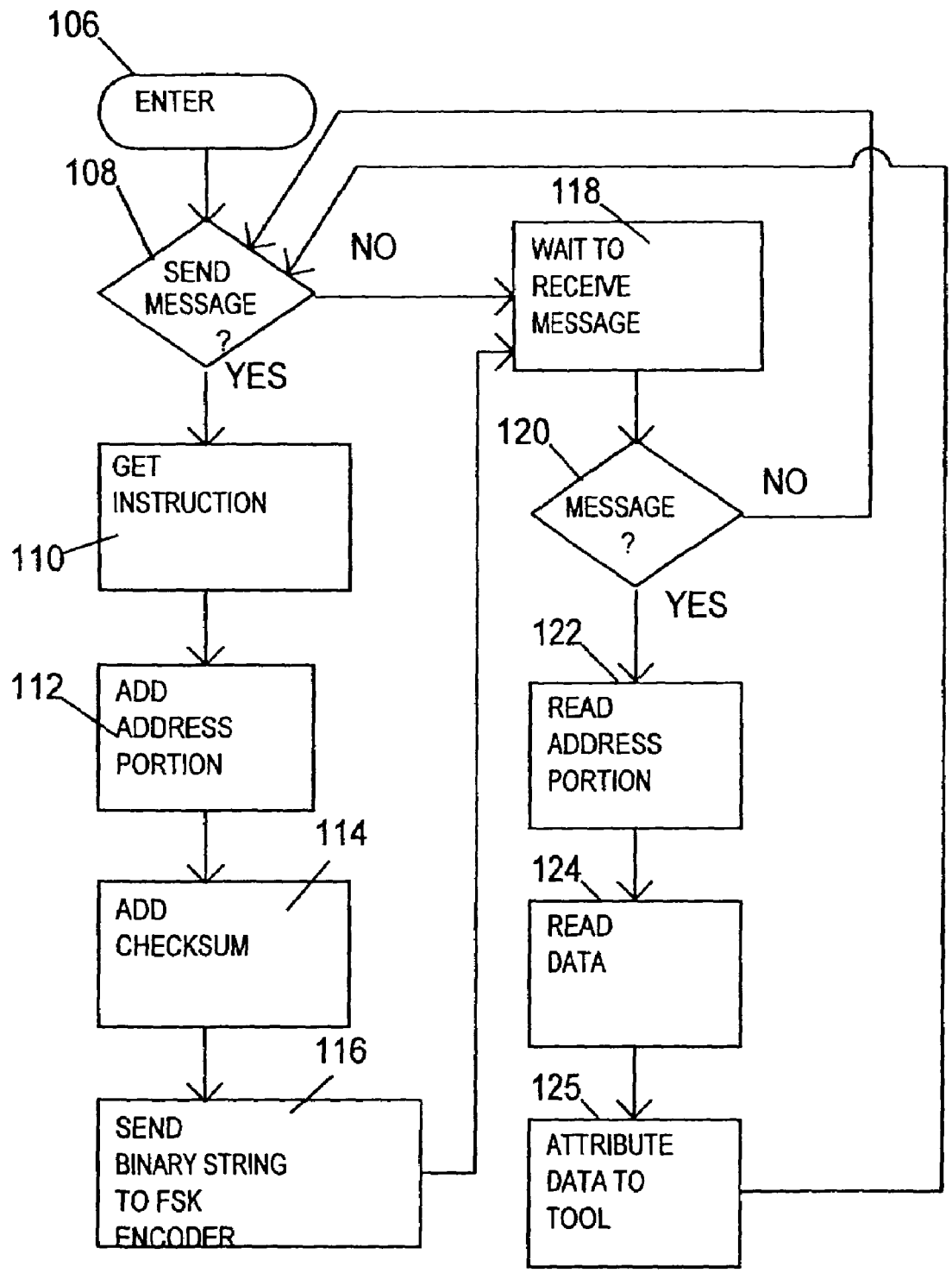

FIG. 6 is a flow chart illustrating the activities of the surface signalling equipment.

Figure 1:
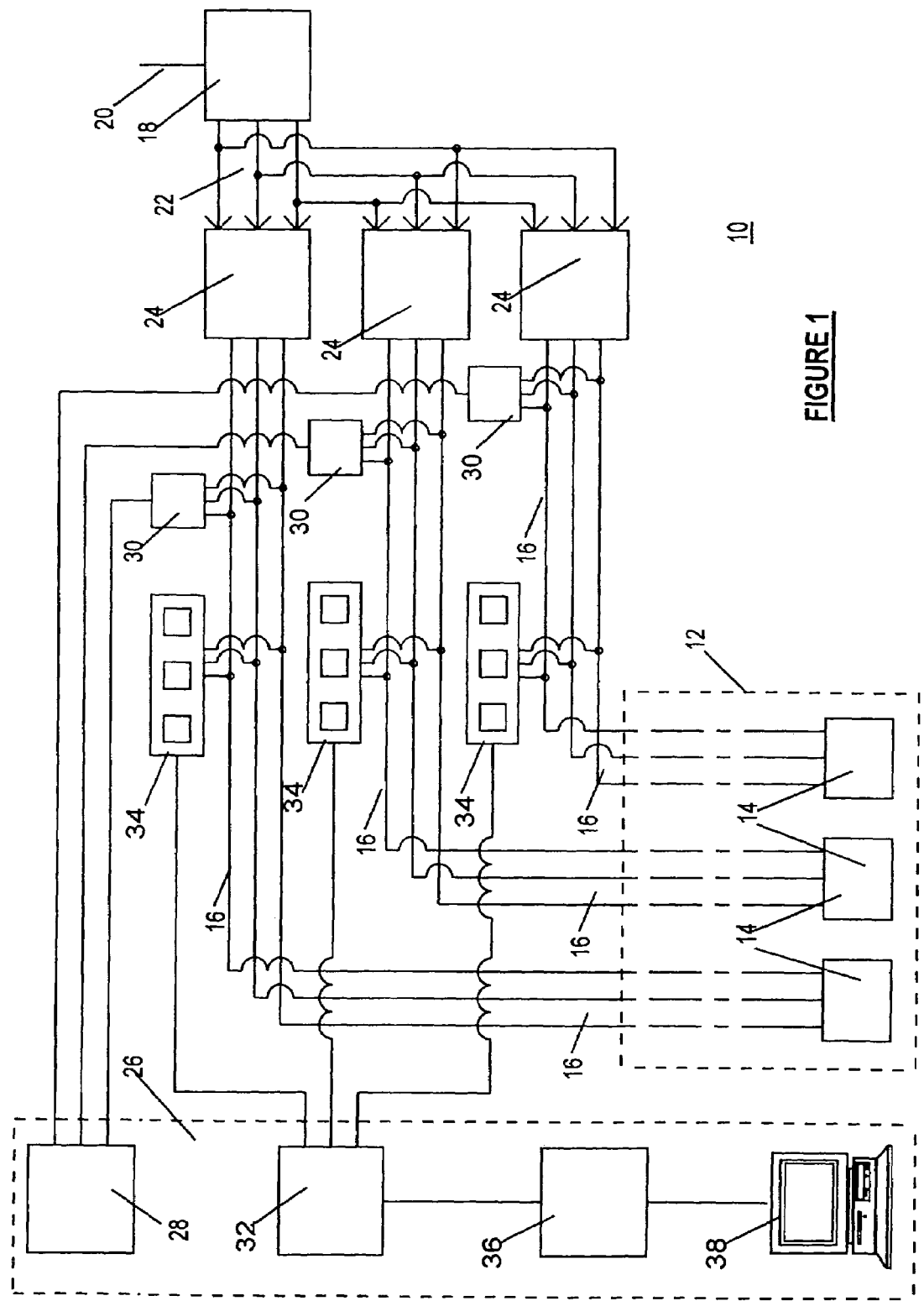
FIG. 1 is a schematic block diagram of the overall arrangement whereby one or more downhole tools can be in communication with the surface in a hydrocarbon well.

Attention is first drawn to FIG. 1 showing a schematic block diagram of the overall arrangement of parts where a plurality of downhole tools are in communication with the surface in a hydrocarbon well.

A hydrocarbon well 10 comprises a well bore 12 (shown in dotted ourline) down which are disposed a plurality of tools 14 powered via three phase cables 16. In this example each tool 14 is shown as being connected to its own particular three phase cable. It is to be appreciated that the present invention also allows more than one tool 14 to be provided on a three phase cable 16. The well bore 12 is a hole, extending through the earth, perhaps for many thousands of feet. The well bore 12 is generally of the order of 30 cm in diameter and can be a branching structure with inclined or horizontal areas rather than just a straight, vertical hole. The tools 14, although shown in FIG. 1 as being all at the same depth in the well bore 12, are in fact disposed at different locations in the well bore 12, being at different depths and/or in different branches of the well bore 12. In general terms, each of the tools 14 will be remote from all of the other tools 14. The three phase cables 16 are also fed into the narrow well bore 12, there being one three phase cable 16 for each of the tools 14.

In this example, the tools 14 are electrical submersible pumps (ESP's) used for pumping oil and/or water. It is to be appreciated that the tools 14 can be any other type of downhole powered device suitable for use in an oil exploration or production well. The well bore 12 may be on land, or may be beneath the sea at a depth of, for example, 300 metres.

At the surface, a step down transformer 18 accepts an 11,000 volts feed 20 from a distribution transformer and provides 2,000 Volts (for example) three phase input 22 to each of a plurality of electrical switchboards 24 which provide the three phase cables 16 to the downhole tools 14.

A surface control panel 26 (also referred to herein as a "control station") comprises a power supply 28 coupled to each of the three lines in each of the three phase cables 16 through a choke 30 so that each of the downhole tools 14 receives a common mode low DC voltage suitable for powering downhole electronic equipment shown later in FIG. 2. The power supply 28 can be any power source capable of powering the downhole equipment which receives and sends messages to and from a tool 14, and can include DC supplies at a range of voltages or AC supplies, also at a range of acceptable voltages.

An AC supply 28 is preferred in this example, because the supply 28 is generally, if DC, subject to loss through ground faults on the cables 16. However, an AC supply 28 is ground fault tolerant, and is thus the style of supply 28 of preference.

The purpose of each choke 30 is to provide isolation from the high (2,000 Volts) AC voltages encountered on each of the three phase cables 16. The chokes 30 play no part in the signalling path of the present invention, and therefore do not have any influence on the signalling speed.

A signal drive board 32 is coupled, in common mode, to each of the conductors in the three phase cable 16 through a high voltage signal isolation module 34. The signal drive board 32 can send signals to a downhole tool 14 or receive signals from a downhole tool 14.

A processor board 36 decodes received messages from the signal drive board 32 and prepares messages to be sent by the signal drive board 32. The processor board 36 is in bi-directional communication with a central processor 38 (such as a personal computer) which is the overall source of data to be transmitted, the overall recipient of data which is received, and an organ of logging, organisation and display.

The signal drive board 32 and the processor board 36 can be plug-in cards or modules within the central processor 38. Equally, the central processor 38 may be connected by a data link, such as an RS232 serial connection, to the processor board 36. In another example, the central processor 38 can be coupled by land line, satellite communication, radio link or any other way from a remote point to the processor board 36. The processor board 36 can be accessible through a machine accessible communication facility, such as an Internet or other pageable site.

The high voltage signal isolation module 34 is situated on the signal drive board 32 and, in each instance, comprises a high pass filter, a low pass filter and a band pass filter, as will later be described with reference to FIG. 3.

In the example of the invention given, there are shown three downhole tools 14. It is to be appreciated that this does not constitute a limit upon the invention, the invention functioning equally well with just a single downhole tool 14, or with 4, 5, 6 or even many more downhole tools 14. The invention is also applicable to one, or a plurality of tools in each of a plurality of wells 10. Equally, as will be explained later, more than one tool 14 can be provided on each three phase cable 16. The invention also works in those situations where the cable is more or less than three phases.

Figure 2A:
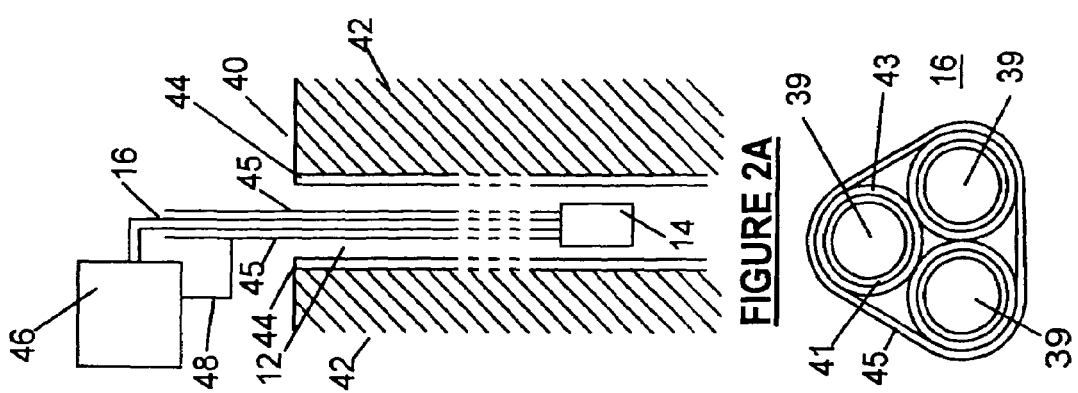
FIG. 2A is a schematic diagram of one possible arrangement showing the disposition of the different elements within a well bore.

Attention is next drawn to FIG. 2A, showing a schematic cross-sectional view of one possible arrangement of components within a hydrocarbon production well.

The well bore 12 passes from the surface 40 through the surrounding soil and rock 42. If the hydrocarbon well 10 is at sea, there may also be layers of seawater, sand and other sediments. The well bore 12 is lined with a metallic conducting casing 44 which contains oil or other hydrocarbons from seeping into the surrounding soil and rock 42.

The tool 14 may be provided within casing 44, at the end of the three phase cable 16. The tool 14 is attached to a tubing 45, such as a production tubing, so that the production tubing 45 provides a local ground reference potential. The surface equipment 46 has a coupling 48 to the ESP which, in turn, is attached to a production tubing 45. The surface equipment 46 (which includes all of the surface electronic equipment such as the surface control panel 26) also has a grounding on the production tubing 45. The surface equipment 46 and the tool 14 thus enjoy a common ground in the form of the production tubing 45. The common ground can be any conductive member that normally can be found extending down or within a well bore 12 and depending on the type of tool 14, it can even be casing 44.

Figure 2B:
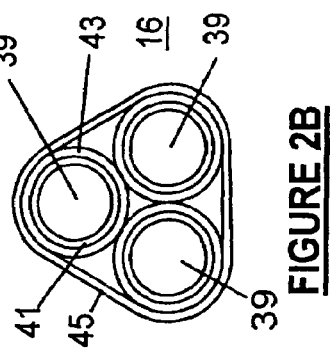
FIG. 2B is a cross sectional view of one possible structure for a three phase cable 16.

Attention is next drawn to FIG. 2B, showing a cross sectional view of one possible embodiment of a three phase cable 16, usable in the present invention.

Three conductors 39 are each surrounded by a layer of mineral insulation 41 which lies within a metal sheath 43, the whole arrangement being held together by armour wrapping 45. This is just one possibility. The conductors 39 and their insulation 41 and metal sheaths 43 can be arranged in a linear fashion, or any other fashion.

Figure 3:
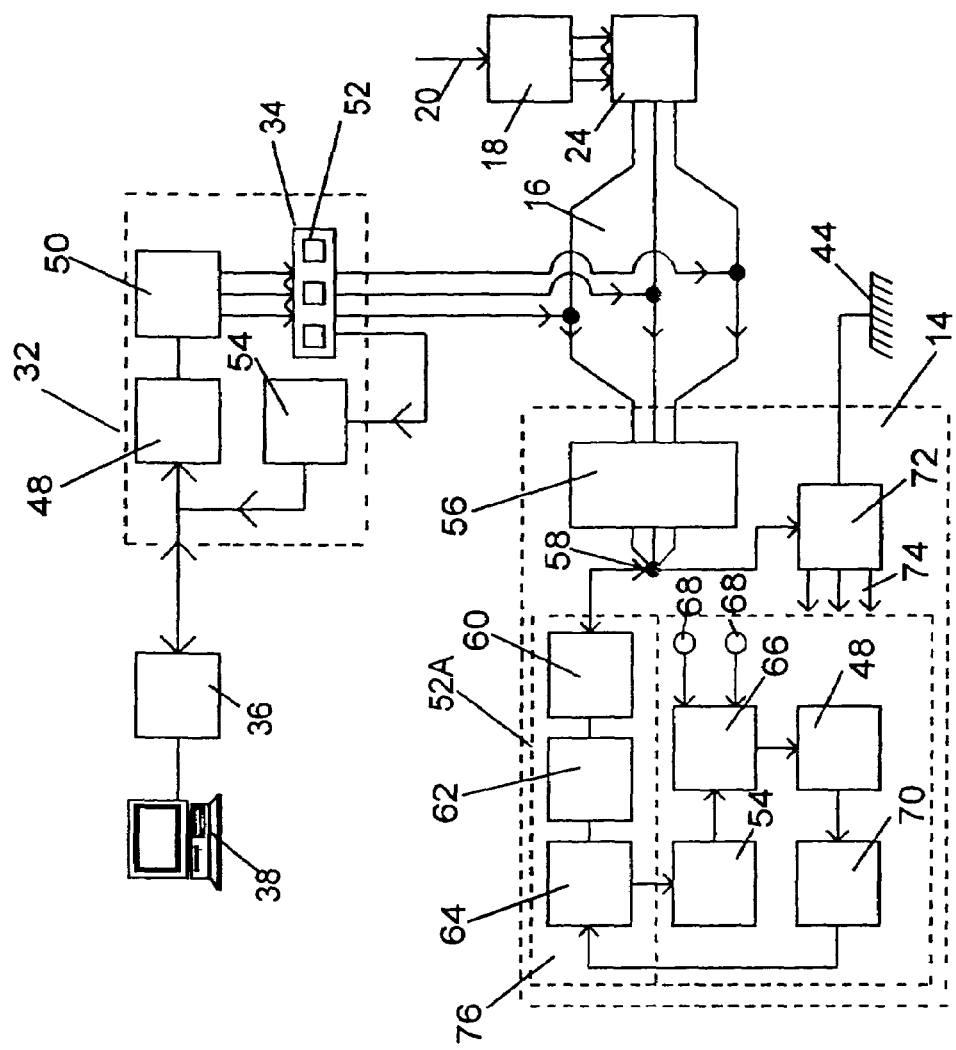
FIG. 3 is more detailed schematic block diagram showing the various component parts of the signalling system

Attention is next drawn to FIG. 3, showing a more detailed schematic diagram of the tool 14, and of the signal drive board 32, connected to provide communication between the tool 14 and the surface control panel 26.

FIG. 3 includes many elements also shown in FIG. 1, and like numbers denote like entities.

The signal drive board 32 comprises a frequency shift keying encoder 48 which receives a serial string of binary data from the central processor 38 via the processor board 36, converts the serial string of binary data into a frequency shift keyed signal where a first frequency denotes a binary zero and a second frequency denotes a binary one, and feeds the frequency shift encoded signal as an input to a drive circuit 50 which generates three identical signals which are each applied to each the three three phase cables 16 through the high voltage signal isolation module 34.

In the example given as the embodiment of the present invention the two frequencies concerned are 12.674 KHz and 13.227 KHz. It is to be appreciated that the invention covers other frequencies and other bands of frequencies. It is also to be appreciated that the present invention is also compatible with and encompasses three tone, four-tone and other, higher order signalling systems and is not restricted to two tone frequency shift signalling nor to binary representation of values.

The high voltage signal isolation module 34 comprises three filter units 52. There is one filter unit for each three phase cable 16. A single filter unit 52A is to be found at the tool and is later described.

The signal drive board 32 further comprises a frequency shift decoder 54 which is also coupled to the high voltage signal isolation module 34. The frequency shift decoder 54 comprises counting circuits, or a simple phase locked loop decoder to convert the frequencies of the frequency shift key modulation into binary ones or zeros which are fed through the processor board 36 to the central processor 38. Reception also occurs of FSK signals at the monitoring equipment at the tool 14, to be later described, in the same manner as at the signal drive board 32.

In this example, the frequency shift keying encoder 48 and the frequency shift keying decoder 54 are shown as being part of the signal drive board 32. The present invention permits the frequency shift keying encoder 48 and the frequency shift keying decoder 54 to be situated anywhere within the overall apparatus which is consistent with their function, and a particularly advantageous place for the frequency shift keying encoder 48 and the frequency shift keying decoder 54 is on the signal processor board 36.

The signals from the drive circuit 50 through the high voltage signal isolation module 34 are provided on to each of the three phase cables 16 which are fed, as shown in FIG. 1, from an 11,000 Volts feed through a step down transformer 18 and a switchboard 25 to become a three phase supply at 2,000 Volts to be fed into the well bore to the tool 14 (which can be one or more kilometers away)

In the well bore 12 tool 14 comprises an electrical submersible pump (ESP) 56. The three three phase cables, having passed through the winding of the motor on the electrical submersible pump 56, join at a star point 58 beyond the electrical submersible pump 56.

The star point 58 is, if everything balances within the motor of the electrical submersible pump 56, and if the three phase cables 16 are also resistably balanced, a point which should, theoretically, have no residual signal from the wave forms which drive the motor of the electrical submersible pump 56. It is to be recollected, from FIG. 1, that the power supply 28 was fed, in common, through chokes 30, to provide a common mode signal on the three phase cables 16. It is also to be observed that the drive circuit 50 in the signal drive board 32 provided a common mode signal on each of the three phase cables 16 representing frequency encoded digital data. The star point 58 thus represents a point where communication signals and a power supply are provided. The star point 58 is coupled as input to a downhole filter unit 52A which, in common with the filter units 52 to be found in the high voltage signal isolation module 34, comprises a high voltage high pass filter 60 followed by a low pass filter 62 and a band pass filter 64. The exact parameters between the two filter units 52 52A can differ, as can voltage ratings and frequencies. However, both types of filter unit have the same function of filtering the signals from any other noise.

In those possible embodiments where more than one tool 14 is powered by only a single three phase cable 16, a star point 58 can be made by joining each of the three three phase cables 16 to a virtual star point 58 using equal impedances.

These three filters 60, 62, 64 provide isolation from the potentially high voltage (2,000 Volts) which drive the electrical submersible pump 56 and also filter out the frequency shift keyed signal from the drive circuit 50. There is no reason why the filters 60, 62, 64 should not also include a band stop filter for removing the relatively low frequency supply (50/60 Hz) that drives the motor in the electrical submersible pump 56 or band pass filters for the FSK frequencies.

The output from the band pass filter 64 is coupled as input to a frequency shift decoder 54 which decodes the frequency shift encoded signal from the drive circuit 50 and converts it into a serial stream of binary data which is provided as input to a microprocessor 66.

The microprocessor 66 serves much the same function as the central processor 38 in the surface control panel 26. In particular, the microprocessor 66 is coupled to monitor sensors 68 disposed in the well bore 12 in the vicinity of the tool 14 and operatives to measure, for example, temperature and pressure within the well bore 12, or, indeed, any other measurable parameter within the well bore 12 including, but not restricted to, chemical properties, visible and non visible optical properties, density, viscosity, sound propagation rate and flow rate.

One of the functions of the microprocessor 66 is to monitor whether an instruction from the surface control panel 66 is addressed to that particular tool 14. The manner in which this is done is explained later. If the microprocessor 66 discovers that an instruction to report to the surface control panel 26 has been received, the microprocessor 66 then reads and encodes the data from the sensors 68 and passes the data, together with other information, to a frequency shift keying encoder 48 which performs the same function as the frequency shift keying encoder 48 otherwise shown in FIG. 3 in the signal drive board 32. The frequency shift keying encoded data stream is passed to a single drive circuit 70 similar to each of the three drive circuits required in drive circuit 50, the single drive circuit 70 passing back through the filter unit 52 to drive the star point 58.

A local power supply module 72 receives the voltage from the power supply 28 (shown in FIG. 1) via the star point 58 and converts it into multiple power supply voltages 74 for use by the various elements 48, 54, 66, 70 in the electronic module 76 within the tool 14. The whole tool 14, including the electronic module 76 and the local power supply module 72 uses the production tubing 45 as a local ground reference point.

The electronic module 76 serves as a communications device in the vicinity of the tool 14. In FIG. 3 the electronic module 76 is shown as being integral with the tool. In fact, the electronic module 76 need only be near enough to the ESP 56 to send and receive signals and derive power, in other words, the electronic module is a device in the vicinity of the tool 14. The electronic module 76 is generally referred to hereinafter as a "communication device" and may include sensors 68, in which case it may be generally referred to a "monitoring equipment".

Figure 4:
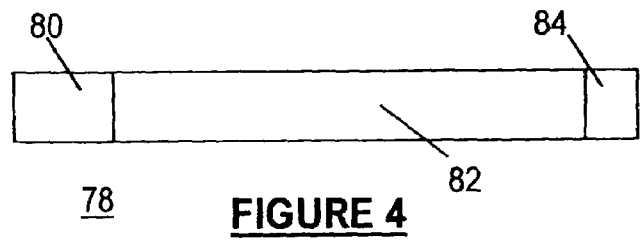
FIG. 4 is a diagram illustrating the structure of a digital message

Attention is next drawn to FIG. 4 showing an exemplary message of the type which could be sent from the surface control panel 26 to the tool 14 or from the tool 14 to the surface control panel 26. The message 78 comprises an address portion 80. If the message 78 comes from the surface control panel 26 the address portion 80 indicates which of the tools 14 is to receive and interpret the message 78. If the message is to travel from a tool 14 to the surface control panel 26, the address portion 80 indicates from which tool 14 the message originated.

The message 78 next comprises an information portion 82 which, if the message comes from the surface control panel 26 to a tool 14, is an instruction to be obeyed by the electronics module 76 of the tool 14 and, typically, is an instruction to send the readings of the sensors 68. If the message comes from a tool 14 to the surface control panel 26, the information portion 82 will typically convey indications of the reading of the sensors 68.

Of course, the message portion can convey instructions to do anything else, such as to switch on or switch off pieces of apparatus, to move towards being more open or more closed if the tool is a valve, or to take different readings and, where the information portion comes from a tool 14, can include readings of other variables than temperature and pressure, and can include PH, current consumed by the pump 56 or other tool, and so on.

Finally, the message 78 contains a check sum 84 which is used for error detection and/or error correction should an error occur in the message 78. In its simplest form, the check sum 84 can be a simple parity check. In its most complicated form, the check sum 84 can be any one of the error correction and detection codes and methods used in the digital transmission of data.

Figure 5:
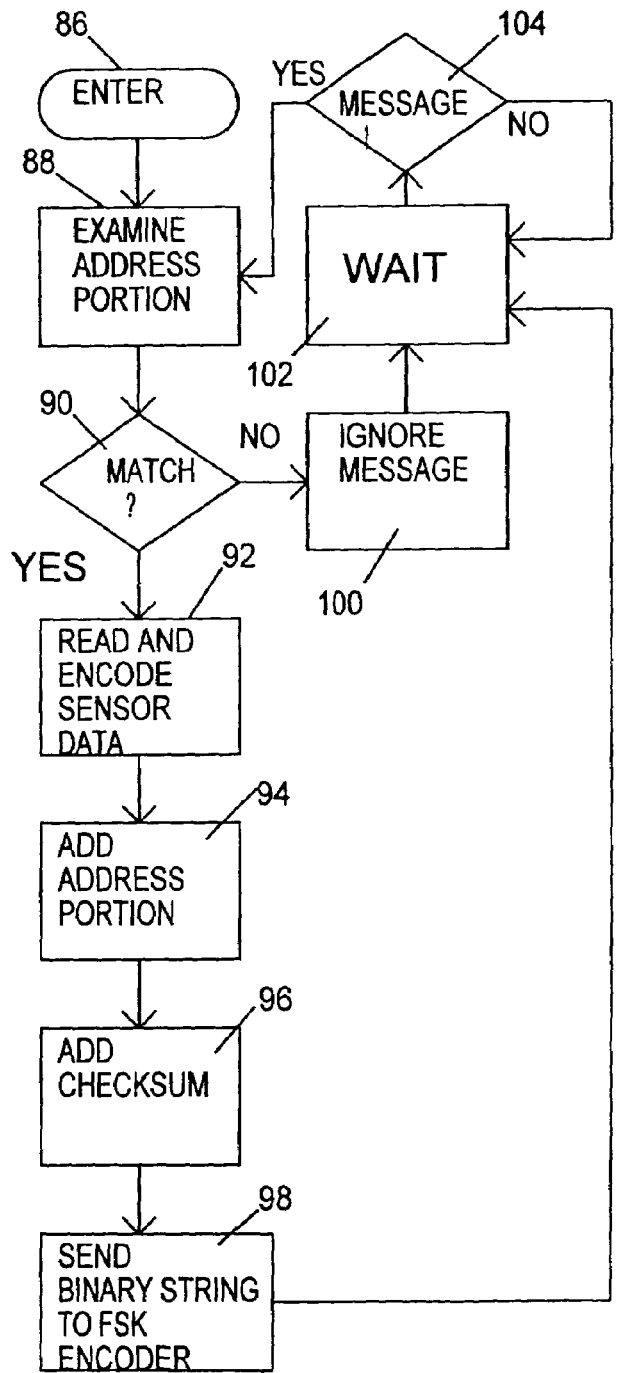
FIG. 5 is a flow chart illustrating the activities of the downhole monitoring equipment.

Attention is next drawn to FIG. 5, showing a flow chart generally indicative of one embodiment of the behaviour of the microprocessor 66 in the electronic module 76 of the tool 14. The flow chart of FIG. 5 assumes that an instruction is sent from the surface to the communication device/monitoring equipment to make the sensors 68 take a reading and then transmit such readings to the surface. It is noted however, as previously disclosed, that a variety of instructions may be sent from the surface to the communication device/monitoring equipment and that such communication device/monitoring equipment will respond in accordance with the instructions.

From entry 86 upon first receipt of a message, a first operation 88 examines the address portion of a message 78 and compares it with the stored and known address for that particular tool 14. If a first test 90 finds that there is a match, this means that the message 78 is destined for that particular tool 14.

A second operation 92 reads the values of the parameters measured by the sensors 68 and encodes the data as a string of binary numbers. A third operation 94 then adds the address portion 80 indicative of that particular tool. Finally, a fourth operation 96 adds the check sum 84 to complete the binary digital data. A fifth operation 98 then sends the serial string of binary data to the frequency shift keying encoder 48 in the tool 14 which goes, automatically, from there to the single drive circuit 70 to be sent from the star point 58 after the filter unit 52 through the three phase cable 16 to the surface control panel 26.

The fifth operation 98 is the end of the sending process.

Returning to the first test 90, if there is no match between the address of the incoming message 78 and the address of the particular tool 14, this means that the message is not destined for that tool 14. Accordingly a sixth operation 100 ignores the message and a seventh operation 102 waits, looking for incoming messages until a second test 104 detects that a new message has been received when control is returned to the first operation 88 once again to examine the address portion 80 of the incoming message 78.

The invention permits an alternative form of operation where tool 14 can provide a second type of digital message (a report) without reception of a first type of digital message (an instruction), this alternative form of operation being employed for diagnostic purposes and for tuning during a power up sequence where the FSK frequencies can be changed to avoid particular interference (new Figure). The alternative form of operation can also comprise transmitting sensor 68 readings at specified time intervals or upon the occurrence of certain events. The data sent to the surface in this alternative form of operation is, in one embodiment, packaged in a message 78, as previously disclosed.

Attention is finally drawn to FIG. 6 showing a flow chart of one embodiment of the activity of the processor board 36 and/or the central processor 38.

From entry 106 a third test 108 checks to see if the central processor 38 is ready to send a message. If the central processor 38 is ready to send a message, an eighth operation 110 gets the instruction that is to be sent to a tool 14, a ninth operation 112 adds the address portion 80 which designates the tool 14 which is to receive the instruction, and a tenth operation 114 adds the check sum. The string of assembled binary data is then sent to the frequency shift keying encoder 48 on the signal drive board 32 by an eleventh operation 116. Control is then returned back to a twelfth operation 118, described immediately below.

If the third test 108 detects that no message is currently to be sent by the surface control panel 26, the twelfth operation 118 waits, looking for a received message. If a fourth test 120 detects that no message is currently being received, control passes back to the third test 108. Thus, in the event of nothing to do, the surface control panel 26 looks either to send messages or to receive messages.

If the fourth test 120 detects that a message is being received, a thirteenth operation 122 reads the address portion 80 of the incoming message, a fourteenth operation 124 reads the data in the information portion 82, and a fifteenth operation 125 attributes the data read from the information portion 82 to the particular tool indicated by the address portion 80 of the incoming message. The processor then carries out any operation, if necessary, as indicated in the message. Control then passes back to the third test 108 where the next activity is awaited.

In an alternative form of operation, the processor board 36 or the central processor 38 can broadcast a message to all tools 14 by employing a default universal address portion 80 which is recognised by all tools 14, or by specific groups of tools 14, for the addressed plural tools to respond.

The invention has been described with reference to an example involving a three phase downhole tool 14. It is to be appreciated that the present invention is equally applicable to use with a tool 14 which is single phase, or any other combinations of phases and frequencies, Likewise, the tool, given in the example is Electrical Submersible Pump. It is to be appreciated that the present invention is apt for use with any other style or function of downhole device.

The present invention also has the advantage that it allows signalling to continue even when the power supply to the tool 14 is shut down.

The present invention also provides for tuning the frequencies used in the frequency shift keyed signal. Interference, noise and other factors may make a particular spaced pair of frequencies unsuitable for communication. Accordingly, the surface control panel comprises tuning means, operable to select the frequency pair used by the transmission and reception process. The tuning means firstly selects one set of frequencies for use in the frequency shift keyed signal. A test message is then transmitted from the surface control panel to a tool. If the tool 14 signals back that the transmission of the message was adequate, the tuning means retains that set of frequencies as operating frequencies. If the transmission of the test message was inadequate, as indicated by the tool 14 either failing to receive the test message and failing to respond, or signalling back either indicatively of or with an unacceptable error rate, the tuning means selects another set of frequencies to test, and so on until a successful set of spaced frequencies is found. The selected frequencies can move in any direction in frequency, one option being exclusively upwards, another option being exclusively downwards. Indeed, any algorithm for selecting further frequencies to test is also an acceptable option.

The invention claimed is:

1. A method for providing communications in a conduit between a control station and a communication device in the vicinity of a tool, said tool being electrically powered through cable, within the conduit, said method comprising the steps of: generating a signal representative of a data message to be sent; adding said signal to a power waveform on the cable; separating said signal from the power waveform on the cable; decoding said separated signal; and providing the cable as three phase cable to power the tool within the conduit; creating a star point in the vicinity of the tool; and coupling signals from the control station to said device and signals from said device to the control station through said star point.

2. A method, according to claim 1, including the steps of: originating said data message at said control station; and receiving said data message at said device.

3. A method, according to claim 1, including the steps of: originating said data message at said device; and receiving said data message at said control station.

4. A method, according to claim 3, including the steps of employing a first type of data message for sensing instructions from said control station, and employing a second type of data message for sending reports from said device to said control station.

5. A method, according to claim 4, including the steps of: employing a plurality of tools, each in the vicinity of a respective device, in said conduit; at said control station, including, in said first type of data message, a device address portion indicative of the identity of the device to which an instruction is addressed; sending said first type of data message to all of the plurality of devices; decoding said address portion at each of the plurality of devices; and a particular one of said plurality of devices responding to the instruction only if the address portion of the first type of data message is indicative of the first type of data message being addressed to that particular one of said plurality of devices.

6. A method, according to claim 4, including the steps of: employing a plurality of tools, each in the vicinity of a respective device, in said conduit; at said control station, including, in said first type of data message, a device address portion indicative of the identity of a plurality of addressed devices to which an instruction is addressed; sending said first type of data message to all of the plurality of devices; decoding said address portion at each of the plurality of devices; and all of said plurality of the addressed devices responding to the instructions.

7. A method, according to claim 4, including the steps of: employing a plurality of tools, each in the vicinity of a respective device, in said conduit; at one of said devices, including, in said second type of data message, a report address portion indicative of the identity of the device from which a report originates; decoding said report address portion at said control station; and attributing the report to that one of said plurality of devices indicated by the report address.

8. A method, according to claim 4, including the step of a device providing a second type of digital message without reception of a first type of digital message.

9. A method, according to claim 4, including the step of causing a device, from among said plurality of devices, to provide a report only after that particular device has received an instruction to provide a report.

10. A method, according to claim 4, including the step of employing said second type of digital message for diagnostic purposes.

11. A method, according to claim 4, including the step of employing said second type of digital message for tuning during a power up sequence.

12. A method, according to claim 4, including the step of employing said second type of digital message for indicating a reading from a sensor.

13. A method, according to claim 1, including the steps of: including, in each sent data message, an error detection portion containing error detection information; and examining said error detection portion in each received data message to determine the digital integrity of the message.

14. A method, according to claim 13, including the step of employing, in said error detection portion, error detection information capable of allowing for correction of one or more errors.

15. A method, according to claim 13, wherein said error detection information includes a checksum.

16. A method, according to claim 1, for use where said cable comprises at least two phases, said method including the step of adding said signal to at least one of said phases.

17. A method, according to claim 1, including the step of creating said start point by joining the three phase cables after passage through the tool.

18. A method, according to claim 17, including the steps of: providing a power supply for said device; coupling the power supply to at least one of the cables; and coupling the power supply to said device via the star point.

19. A method, according to claim 1, wherein said conduit is the well bore within the hydrocarbon production well and wherein said control station is a surface station.

20. A method, according to claim 1, including the steps of: grounding said device to a common ground; and grounding the control station to said common ground.

21. A method, according to claim 20 wherein said common ground comprises a conductive element within the well bore.

22. A method, according to claim 21, wherein said conductive element comprises well bore casing.

23. A method, according to claim 21, wherein said conductive element comprises tubing extending in said well bore.

24. A method, according to claim 1 including the step of employing, as said signal representative of a data message, a frequency shift keyed signal.

25. A method, according to claim 24, including the step of separating the frequency shift keyed signal from the power waveform on the cable by employing one or more frequency filters.

26. A method, according to claim 25, wherein said one or more frequency filters includes at least one of: a low pass filter; a high pass filter; and a band pass filter.

27. A method, according to claim 24, including the step of tuning by: selecting one set of frequencies for said frequency shift keyed signal; transmitting a test message using said one set of frequencies; if said transmission of said test message is adequate, retaining said one set of frequencies as operating frequencies; and if said transmission of said test message is inadequate, selecting another set of frequencies as said one set of frequencies.

28. A method, according to claim 27, including the step of selecting a first spaced pair of frequencies as said one set of frequencies; and selecting a second spaced pair of frequencies, spaced from said first spaced pair of frequencies, as said another set of frequencies.

29. A method, according to claim 28, wherein said second spaced pair of frequencies is higher in frequency than said first spaced pair of frequencies.

30. A method, according to claim 28, wherein said second spaced pair of frequencies is lower in frequency than said first spaced pair of frequencies.

31. An apparatus for providing communication in a conduit between a control station and a communication device in the vicinity of a tool, said tool being electrically powered through cable, within the conduit, said apparatus comprising: generating means operative to generate a signal representative of a data message to be sent; signal addition means operative to add said signal to a power waveform on the cable; separating means operative to separate said signal from the power waveform on the cable; and decoding means operative to decode said separated signal; wherein
said cable is a three phase cable, operative to power the tool within the conduit said apparatus further comprising: a star point in the vicinity of the tool; and means to couple signals from the control station to said deice and signals from said device to the control station through said star point.

32. An apparatus, according to claim 31, wherein said data message originates at said control station and is received at said device.

33. An apparatus, according to claim 31, wherein said data message originates at said device; and is received at said control station.

34. An apparatus, according to claim 33, including means to generate a first type of data message from sending instructions from said control station, and means to generate a second type of data message for sending repots from said device to said control station.

35. An apparatus, according to claim 34, further comprising: a plurality of tools, each in the vicinity of a respective device, in said conduit; at said control station, means to include, in said first type of data message, a device address portion indicative of the identity of the device to which an instruction is addressed; broadcast means, operative to send said first type of data message, a device address portion indicative of the identity of the device to which an instruction is addressed; broadcast means, operative to send said first type of data message to all of the plurality of devise; device address decoding means operative to decode said device address portion of each of the plurality of devices; and response means, operative to cause a particular one of said plurality of devices to respond to the instruction only if the device address portion of the first type of data message is indicative of the first type of data message being addressed to that particular one of said plurality of devices.

36. An apparatus, according to claim 34, further comprising: a plurality of tools, each in the vicinity of a respective device, in said conduit; at said control station, means to include, in said first type of data message, a device address portion indicative of the identity of a plurality of addressed devices to which an instruction is addressed; broadcast means, operative to send said first type of data message to all of the plurality of devices; device address decoding means, operative to decode said device address portion at each of the plurality of devices; response means, operative to cause all of said plurality of addressed devise responding to the instruction.

37. An apparatus, according to claim 34, comprising: a plurality of tools, each in the vicinity of a respective device, in said conduit; at any one of said devices, means to include, in said second type of data message, a report address portion indicative of the identity of the device from which a report originates; report address decoding means, operative to decode said report address portion at said control station; and attribution means, operative to attribute the report to that one of said plurality of devices indicated by the report address.

38. An apparatus, according to claim 34, wherein a device is operative to provide a second type of digital message without reception of a first type of digital message.

39. An apparatus, according to claim 34, wherein a device, from among said plurality of devices, is operative to provide a report only after that particular device has received an instruction to provide a report.

40. An apparatus, according claim 34, wherein said second type of digital message comprises diagnostic data.

41. An apparatus, according to claim 34, wherein said second type of digital message comprises data for tubing the apparatus.

42. An apparatus, according to claim 34, wherein said second type of digital message comprises data indicative of a reading from a sensor.

43. An apparatus, according to claim 31, comprising means to include, in each sent data message, an error detection portion containing error detection information; and further comprising examination means operative to examine said error detection portion in each received data message and to determine the digital integrity of the message.

44. An apparatus, according to claim 43, wherein said error detection portion comprises error detection information capable of allowing for correction of one or more errors.

45. An apparatus, according to claim 43, wherein said error detection information includes a checksum.

46. An apparatus, according to claim 31, where said cable comprises at least two phases, and where said signal addition means is operative to add said signal to at least one of said phases.

47. An apparatus, according to claim 31, wherein said star point comprises junction of the three phase cables after passage through the tool.

48. An apparatus, according to claim 47, further comprising: a power supply for said device; means to couple the power supply to at least one of the three phase cables; and means to couple the power supply to said device via the star point.

49. An apparatus, according to claim 31, wherein said conduit is the well bore within a hydrocarbon production well and wherein said control station is a surface station.

50. An apparatus, according to claim 31, further comprising: a common ground; means to ground said device to said common ground; and means to ground the control station to said common ground.

51. An apparatus, according to claim 50 wherein said common ground comprises a conductive element within the well bore.

52. An apparatus, according to claim 51, wherein said conductive element comprises well bore casing.

53. An apparatus, according to claim 51, wherein said conductive element comprises tubing extending in said well bore.

54. An apparatus, according to claim 31, wherein said signal representative of a data message, is a frequency shift keyed signal.

55. An apparatus, according to claim 54, including means to separate the frequency shift keyed signal from the power waveform on the cable comprising one or more frequency filters.

56. An apparatus, according to claim 55, wherein said one or more frequency filters includes at least one of: a low pass filter; a high pass filter; and a band pass filter.

57. An apparatus, according to claim 54, further comprising tuning means: said tuning means being operative to select one set of frequencies for said frequency shift keyed signal; said tuning means being operative to transmit a test message using said one set of frequencies; if said transmission of said test message is adequate, said tuning means being operative to retain said one set of frequencies as operating frequencies; and if said transmission of said test message is inadequate, said tuning means being operative to select a another set of frequencies as said one set of frequencies.

58. An apparatus, according to claim 57, wherein said tubing means is operative to select a first spaced pair of frequencies as said one set of frequencies; and wherein said tuning means is operative to select a second spaced pair of frequencies, spaced from said first spaced pair of frequencies, as said another rest of frequencies.

59. An apparatus, according to claim 58, wherein said second spaced pair of frequencies is higher in frequency than in said first spaced pair of frequencies.

60. An apparatus, according to claim 58, wherein said second spaced pair of frequencies is lower in frequency than said first spaced pair of frequencies.

\* \* \* \* \*